(12) United States Patent
Chaupin

(10) Patent No.: US 8,146,956 B2
(45) Date of Patent: Apr. 3, 2012

(54) COUPLING FOR A CONNECTOR FOR FLUID PIPES WITH A METAL WIRE SPRING

(75) Inventor: Jérome Chaupin, Saint Pierre d'Allevard (FR)

(73) Assignee: A. Raymond et Cie, Grenoble (FR)

( * ) Notice: Subject to any disclaimer, the term of this patent is extended or adjusted under 35 U.S.C. 154(b) by 13 days.

(21) Appl. No.: 12/921,172

(22) PCT Filed: Mar. 21, 2009

(86) PCT No.: PCT/EP2009/002093
§ 371 (c)(1),
(2), (4) Date: Sep. 7, 2010

(87) PCT Pub. No.: WO2009/124645
PCT Pub. Date: Oct. 15, 2009

(65) Prior Publication Data
US 2011/0031743 A1 Feb. 10, 2011

(30) Foreign Application Priority Data
Apr. 7, 2008 (FR) ...................................... 08 01900

(51) Int. Cl.
*F16L 37/00* (2006.01)

(52) U.S. Cl. ............. 285/305; 285/81; 285/86; 285/321

(58) Field of Classification Search .................... 285/26, 285/305, 314, 315, 321, 81
See application file for complete search history.

(56) References Cited

U.S. PATENT DOCUMENTS

| | | | | |
|---|---|---|---|---|
| 3,540,760 A | * | 11/1970 | Jeromson, Jr. et al. | 285/321 |
| 3,574,359 A | * | 4/1971 | Klein | 285/86 |
| 3,922,011 A | * | 11/1975 | Walters | 285/321 |
| 4,707,000 A | * | 11/1987 | Torgardh | 285/305 |
| 4,884,829 A | * | 12/1989 | Funk et al. | 285/305 |
| 5,725,257 A | * | 3/1998 | Sakane et al. | 285/86 |
| 5,749,606 A | * | 5/1998 | Lu et al. | 285/86 |
| 6,969,093 B2 | * | 11/2005 | LeMay et al. | 285/86 |
| 7,469,933 B2 | * | 12/2008 | Swift et al. | 285/86 |
| 7,631,904 B2 | * | 12/2009 | Heim et al. | 285/321 |
| 7,708,320 B2 | * | 5/2010 | Binder et al. | 285/86 |
| 7,770,940 B2 | * | 8/2010 | Binder et al. | 285/86 |
| 2006/0082146 A1 | | 4/2006 | Heim et al. | |
| 2007/0040377 A1 | | 2/2007 | Moretti et al. | |

FOREIGN PATENT DOCUMENTS

EP 0740100 A1 10/1996
WO WO2005/059426 A1 6/2005

* cited by examiner

*Primary Examiner* — David E Bochna
(74) *Attorney, Agent, or Firm* — Faegre Baker Daniels LLP

(57) ABSTRACT

A coupling for a connector for fluid pipes includes a female base in which a male end-piece is inserted to produce a sealed connection. An elastically deformable C-shaped metal wire spring immobilizes the end-piece in the base. A locking sleeve is movable axially around the spring and the base between a first axial position in which the spring can deform radially towards the outside of the base, and a second axial position prohibiting the radial deformation of the spring. The sleeve has at least one radial interior recess into which the spring retracts when deformed by the end-piece in the first position. Each recess is offset axially with respect to the spring in the second position, preventing the radial deformation of the spring and thereby safeguarding the sealed connection.

5 Claims, 4 Drawing Sheets

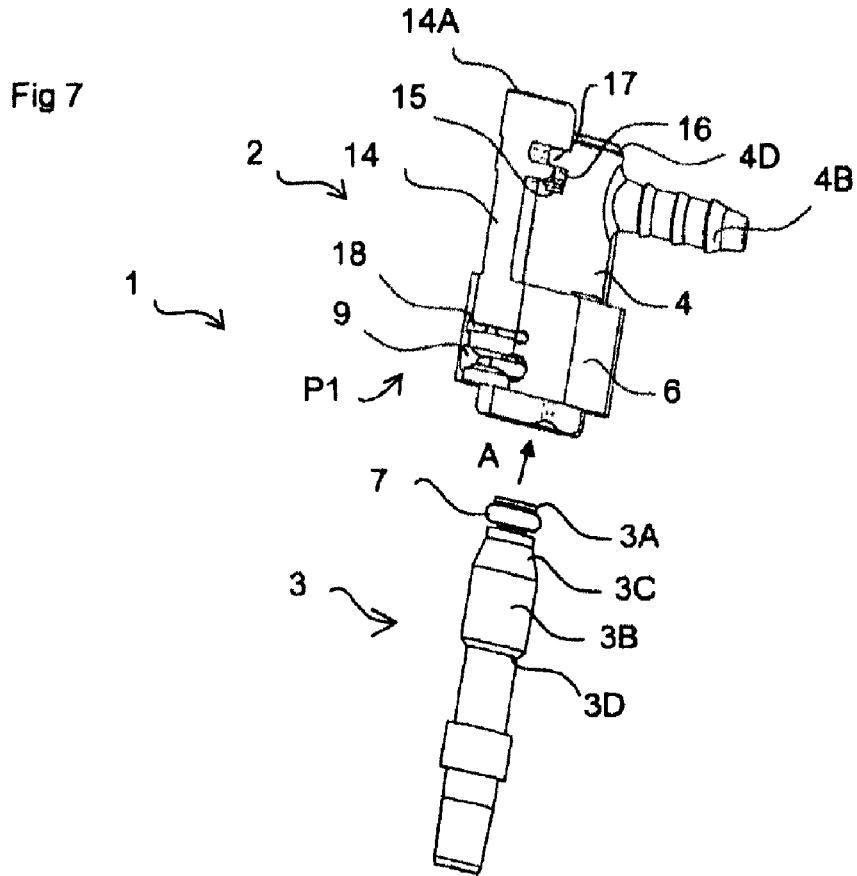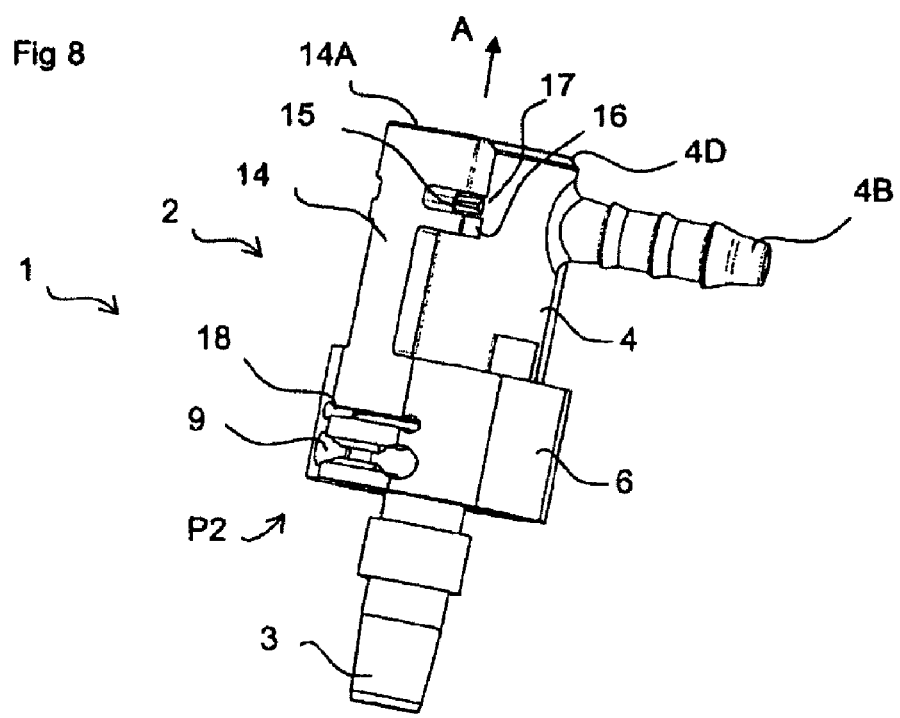

COUPLING FOR A CONNECTOR FOR FLUID PIPES WITH A METAL WIRE SPRING

CROSS-REFERENCE TO RELATED APPLICATION

This application is a U.S. National Phase Patent Application based on International Application Serial No. PCT/EP2009/002093 filed Mar. 21, 2009, the disclosure of which is hereby explicitly incorporated by reference herein.

BACKGROUND OF THE INVENTION

1. Field of the Invention

The present invention relates to a coupling for a connector for fluid pipes, specifically for fuel injection lines of automobiles.

The invention applies in particular to a coupling for a connector for fluid pipes, comprising a female tubular base in which a male tubular end-piece is inserted in a certain axial direction to create a sealed joint, an elastically deformable blocking element for blocking the end-piece in the base when the end-piece is pushed sufficiently deep in axial direction in the base, and a locking sleeve which is mounted movable in axial direction around the blocking element in such way as to occupy a first axial position in which the blocking element is free to deform radially towards the exterior of the base and a second axial position in which it prevents the radial deformation of the blocking element.

2. Description of the Related Art

One known coupling for a fluid pipe connector is disclosed in WO2005/059426, in which the blocking element consists of an assembly of rigid, elastically deformable, arms arranged in tulip shape in the extension of the tubular base. When the locking sleeve occupies the first position, the arms are free to open allowing the insertion of the male end-piece in the base. Then, the arms close (returning to their rest position) in a peripheral groove of the male end-piece in order to block the end-piece in the base. In the second locking position, the sleeve surrounds the elastic arms, preventing their opening and the release of the male end-piece.

SUMMARY OF THE INVENTION

The present invention provides a coupling having a compact and robust design.

To this end, the present invention provides a coupling for a fluid pipe connector, comprising a female tubular base in which a male tubular end-piece is inserted in a certain axial direction to create a sealed joint, an elastically deformable blocking element for blocking the end-piece in the base when the end-piece is pushed sufficiently deep in axial direction in the base, and a locking sleeve which is mounted moveable in axial direction around the blocking element in such way as to occupy a first axial position in which it leaves the blocking element free to deform radially towards the exterior of the base and a second axial position in which it prevents the radial deformation of the blocking element, characterized in that the blocking element is a C shaped rigid wire with two free extremities bent towards each other and suitable to pass through the base when the wire is radially deformed, and in that the sleeve has at least one interior radial recess in which each of the corresponding free extremities of the blocking element engages when the latter is radially deformed and the sleeve occupies said first axial position, when the sleeve occupies said second axial position, each recess is axially offset relative to the corresponding free extremity of the blocking element which prevents the radial deformation of the blocking element.

The coupling according to the invention provides a quick, sealed joint between male end-piece and female base. With such a coupling arrangement, the blocking element can be locked by a short axial travel of the locking sleeve over the base; this travel corresponds approximately to the diameter of the rigid wire forming the blocking element.

Advantageously, locking of the male end-piece in the female base can only occur when the male end-piece is fully inserted in the female base, which ensures that the joint is sealed. Indeed, as long as the male end-piece is only partially inserted in the female base, the blocking element will prevent the axial displacement of the locking sleeve over the base.

Advantageously, a coupling for a fluid pipe connector according to the invention can have the following features:
- the rigid wire is a metallic wire, which has the advantage of good temperature resistance;
- the locking sleeve has a tubular body axially extended by a leg; the leg has one free extremity which protrudes relative to the base when the sleeve occupies said first axial position and which is flush with the base when the sleeve occupies said second axial position. Advantageously, this construction provides a visual and tactile indication of the correct locking of the sleeve on the base, and therefore of the sealing of the joint;
- the base has a detent which is inserted in a notch in the leg of the sleeve when the sleeve occupies said second axial position, which provides security against unexpected unlocking of the coupling;
- the sleeve has a radial slot for radial insertion of said blocking element in the base so that the coupling according to the invention, consisting of three separate elements, is easy to mount.

In one form thereof, the present invention provides a coupling for fluid pipe connector, including a female tubular base in which is inserted in a certain axial direction a male tubular end-piece to create a sealed joint, an elastically deformable blocking element for blocking the end-piece in the base when the end-piece is pushed sufficiently deep in the base in axial direction, and a locking sleeve which is mounted moveable in axial direction around the blocking element in such way as to occupy a first axial position in which it leaves the blocking element free to deform radially towards the exterior of base and a second axial position in which it prevents the radial deformation of the blocking element, characterized in that the blocking element is a C-shaped rigid metallic wire with two free extremities bent towards each other and suitable for passing through the base when the locking element is radially deformed, in that the sleeve has at least one internal radial recess in which each corresponding free extremity of the blocking element is engaged when the latter is radially deformed and the sleeve occupies the first axial position, each recess is axially offset relative to the corresponding free extremity of the blocking element when the sleeve occupies the second axial position, which prevents the radial deformation of the blocking element.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 7 is a perspective view of the connector according to the invention in the first axial position of the sleeve and when the male end-piece is separated from the female base;

FIG. 8 is a perspective view of the connector according to the invention in the second axial position of the sleeve and when the male end-piece is fully inserted in the female base;

Figure 1:
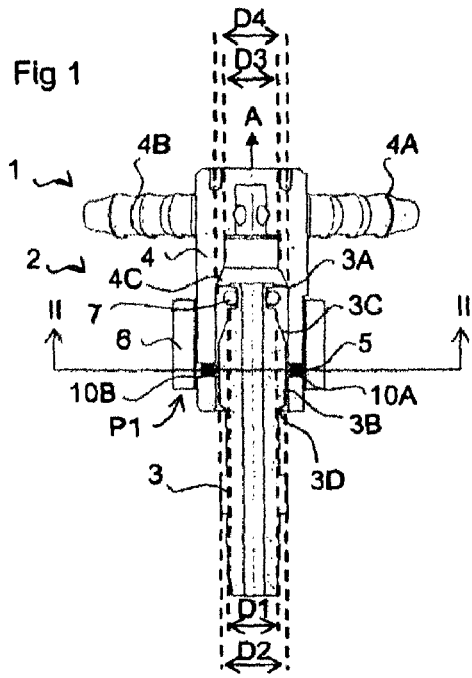
FIG. 1 is a longitudinal section along axis I-I of FIG. 2 of the connector according to the invention in the first axial position of the sleeve and when the male end-piece is partially inserted in the female base.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 shows a fluid pipe connector 1 according to the invention comprising a coupling 2 and a male tubular end-piece 3.

Coupling 2 according to the invention comprises a female tubular base 4 in which the male tubular end-piece 3 is inserted in axial direction indicated by arrow A, an elastically deformable blocking element 5 inserted in the female base 4 and a locking sleeve 6, in the form of a tubular body mounted around the female base 4 and the blocking element 5, which is movable in axial direction A.

In FIG. 1, the male end-piece 3 is shown partially inserted in the female base 4.

As shown in FIG. 1, the female base 4 is fitted, in its upper part opposite the opening in which the male end-piece is inserted, with two fluid lines 4A, 4B which must be connected with the male end-piece 3. It is obvious that the female base 4 can be fitted with one or more than two fluid lines.

Furthermore, the external wall of female base 4 can be provided advantageously with a guide groove or rib cooperating with a corresponding rib of groove (not shown) in the internal wall of the locking sleeve to facilitate the axial guiding of sleeve 6 over base 4.

The male end-piece 3 is shown in the form of a cylindrical tube with varying external diameters over its length. More particularly, it comprises an extremity length portion 3A forming a groove with a first diameter indicated by D1 in FIG. 1, this portion 3A is intended to be inserted in the bottom of the female base 4. An O-ring seal surrounds this portion 3A.

Portion 3A is extended by another length portion 3B with a diameter D2 greater than diameter D1; the two portions 3A, 3B are connected by an intermediate tapered portion 3C with low slope (increasing diameter). As will be described here after, the low slope of portion 3C allows for the progressive radial deformation, towards the exterior of base 4, of the blocking element 5.

The male end-piece 3 has also in the immediate extension of portion 3B, another intermediate tapered portion 3D (decreasing diameter) which precedes a third cylindrical portion (not indicated) having a diameter smaller than D2 but slightly larger than D1. The slope of portion 3D is steeper than the slope of portion 3C to form a sort of shoulder for the blocking element 5 as described further down.

The female base 4 has an axial bore 4C with internal diameters D3, D4 complementary to external diameters D1, D2 of the male end-piece 3. When the male end-piece 3 is fully inserted in the female base 4, the O-ring seal 7 is compressed in the bore of the female base 4 (in the portion of the bore with diameter D3) in order to create a sealed joint. The bore in the base has also a tapered portion, complementary to portion 3C of the male end-piece which serves as centering for the male end-piece in the female base.

Figure 2:
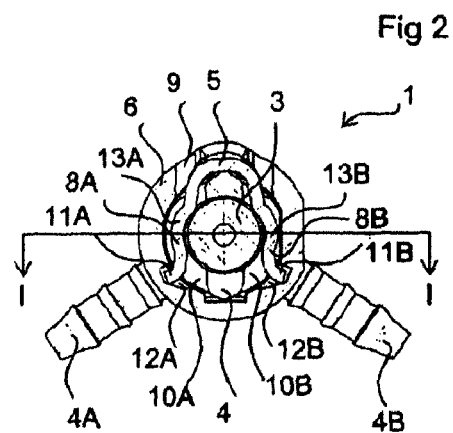
FIG. 2 is a view of a transversal section along axis II-II of FIG. 1 of the connector according to the invention in the same position as FIG. 1.

FIG. 2 shows a transversal section of connector 1 according to the invention in the same position as FIG. 1, which provides a better view of how the blocking element 5 is arranged in the female base 4 and in the locking sleeve 6.

Blocking element 5 is here a spring in the form of a C-shaped staple made of rigid wire, of which the two free extremities 8A, 8B are bent towards each other. This elastically deforming staple can be a round or flat metallic wire. The staple is mounted in coupling 2 by lateral insertion through a radial slot 9 in locking sleeve 6, then in two lateral recesses 10A, 10B of base 4 so that its free bent extremities 8A, 8B surround the male end-piece 3 in bore 4C. As shown in FIG. 2, the free extremities 8A, 8B of staple 5 form two symmetrical S's; the extremities 11A, 11B are bent radially towards the exterior of the free extremities 8A, 8B and engage respectively in two corresponding internal radial recesses 12A, 12B of sleeve 6 and the median parts 13A, 13B of the free extremities 8A, 8B which surround the male tube.

In FIG. 2, staple 5 is radially deformed towards the exterior of base 4 around the length portion 3B with large diameter D2 and the locking sleeve 6 occupies a first axial position, indicated by arrow P1 on FIG. 1, in which it leaves the blocking element 5 free to deform radially towards the exterior of base 4. At rest, the median parts 13A, 13B of staple 5 define a circle with internal diameter approximately equal to D1.

In a first insertion phase of the male end-piece 3 in the female base 4, the portion with length 3A surrounded by seal 7 (with external diameter approximately equal to D1) passes through the staple. Then, the tapered portion 3C of the male end-piece applies a radial deformation stress on the staple which causes the ends 11A, 11B of extremities 8A, 8B to be thrust in recesses 12A, 12B of sleeve 6. Then, the staple 5 surrounds the portion with length 3B and diameter D2. In this deformed position, staple 5 prevents the axial displacement of sleeve 6. The radial recesses 12A, 12B have a height in axial direction which is slightly greater than the height of the staple (diameter of the wire for instance) but which is less than the travel of the sleeve along this axial direction.

Figure 3:
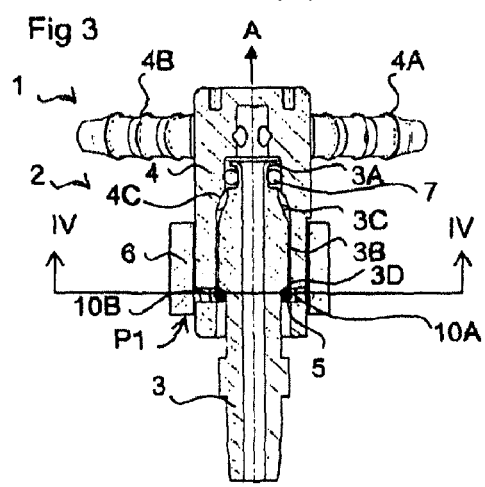
FIG. 3 is a view of a longitudinal section along axis of FIG. 4 of the connector according to the invention in the first axial position of the sleeve and when the male end-piece is fully inserted in the female base.
Figure 4:
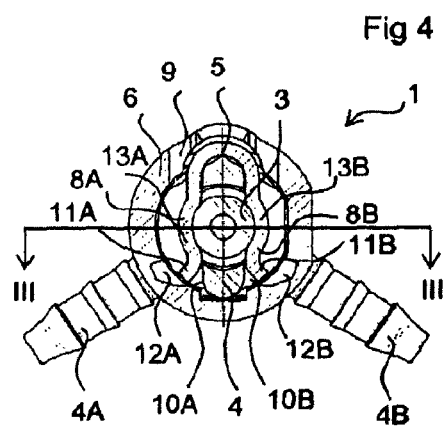
FIG. 4 is a view of a transversal section along axis IV-IV of FIG. 3 of the connector according to the invention in the same position as FIG. 3.

FIGS. 3 and 4 show now the male end-piece fully inserted in the female base 4. The tapered portion 3D, with decreasing diameter, of the male end-piece is now facing staple 5. Seal 7 is compressed in bore 4C of the basis. The free extremities of the staple 8A, 8B are elastically returned to their retracted position (rest position) and are outside the recesses 10A, 10B.

In its retracted position, the staple applies an axial force on the tapered portion 3D which tends to push the male end-piece to the bottom of the bore of the female base.

Figure 5:
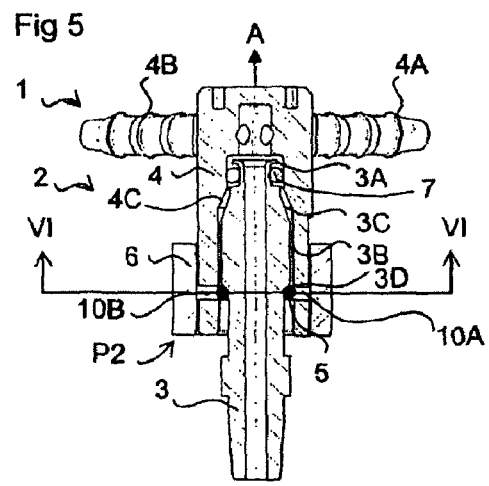
FIG. 5 is a view of a longitudinal section along axis V-V o FIG. 6 of the connector according to the invention in the second position of the sleeve.
Figure 6:
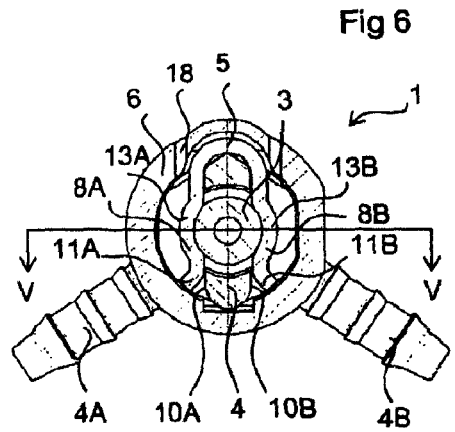
FIG. 6 is a view of a transversal section along axis VI-VI of FIG. 5 of the connector according to the invention in the same position as FIG. 5.

In FIGS. 5 and 6, the locking sleeve 6 is axially displaced (here towards the bottom of the base) from its initial position P1 to a second position P2 to axially offset the recesses 10A, 10B from the ends 11A, 11B of extremities 8A, 8B of staple 5, which prevents radial deformation of staple 5 and therefore locks the male end-piece in the female base.

FIGS. 7 and 8 show in perspective the connector according to the invention, respectively with the male end-piece separated from the base and with the male end-piece inserted in the base. In FIG. 7, the locking sleeve 6 is in its position P1 for insertion of the male end-piece in the female base and in FIG. 8, the locking sleeve 6 is in its position P2 locking the male end-piece in the female base.

As shown in FIGS. 7 and 8, the locking sleeve 6 consists of a cylindrical section with an axially extending leg 14. In position P1 of the locking sleeve 6, the free extremity 14A of the leg 14 protrudes relative to the female base 4. By pressing this free extremity 14A of the leg 14 sleeve 6 is displaced from position P1 to position P2. In the P2 position of the locking sleeve 6, the extremity 14A of the leg 14 is flush with the female base 4, which provides an easy tactile and visual detection to verify that the male end-piece is locked in the female base.

As shown in FIGS. 7 and 8, the base 4 has a detent 15 in the form of a boss and leg 14 of locking sleeve 6 has a notch 17. In position P1 of the locking sleeve, the detent 15 is abutted against face 16 of notch 17, blocking the displacement of sleeve 6 in axial direction A (towards the bottom of the base). In position P2 of the locking sleeve, the detent 15 is inside notch 17, blocking the displacement of sleeve 6 in the axial direction A (towards the top of the base). The displacement of locking sleeve 6 from position P1 to position P2 and inversely requires that a certain axial force is applied on leg 14. The dimensions of detent 15 and notch 17 are adjusted to correspond to the axial travel of the sleeve between the two positions P1 and P2, which is approximately equivalent to the thickness in axial direction of staple 5.

FIGS. 7 and 8 show the radial slot 9 in the sleeve which serves for installing the staple 5 in the base and also a thin slot 18 which serves for the axial positioning of the head of staple 5 in the sleeve when the locking sleeve 6 is in position P2. The axial distance between slots 9 and 18 is identical to the axial travel of sleeve 6 between positions P1 and P2.

To connect the male end-piece 3 in the female base 4 of coupling 2 according to the invention, staple 5 is elastically deformed to allow the passage of a centering diameter D3 of the male end-piece 3. When in contact with this diameter D3, staple 5 achieves the maximum flexion position. In this position, staple 5 interacts with the locking sleeve 6 by engaging in the recesses 12A, 12B made in sleeve 6. The extremities 11A, 11B of staple 5 positioned in this way, perform the function of axial abutment for the descent of locking sleeve 6, which guarantees mechanically that locking will take place only when the staple 5 is returned to its rest position during the passage of a smaller diameter of the end-piece 3 than the centering diameter. In this rest position, staple 5 is locked behind a shoulder 3D of the male end-piece and the locking sleeve 6 can be blocked by an axial displacement.

FIGS. 9 to 12 illustrate a variant configuration of a connector 100 according to the invention with a coupling 200 comprising a locking sleeve 6 with two legs 101, 102 diametrically opposed and axially offset, while leg 101 is slightly longer than leg 102.

Figure 9:
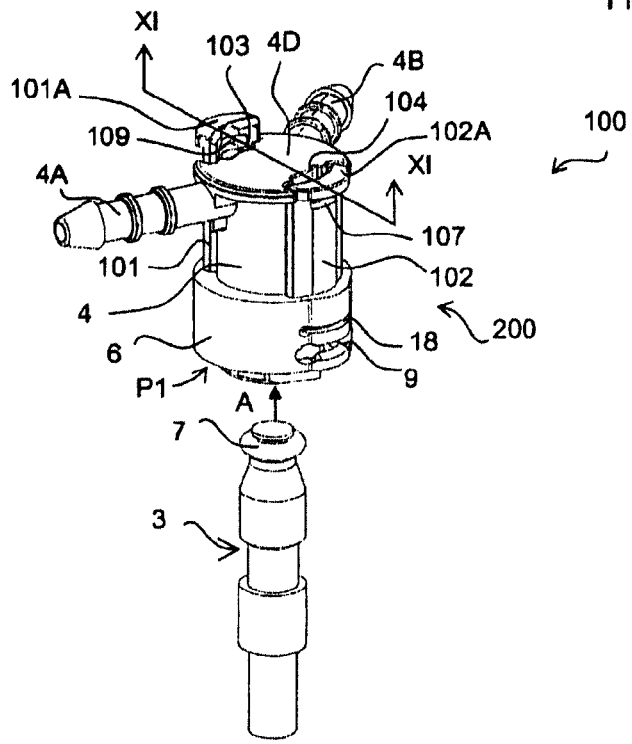
FIG. 9 is a perspective view of the connector according to the invention in another execution form, in the first axial position of the sleeve and when the male end-piece is separated from the female base.

In FIG. 9, the male end-piece 3 is separated from coupling 200 and the locking sleeve 6 occupies the first axial position P1. FIG. 9 shows that the two legs are axially guided in two guide ways 103, 104 diametrically opposed and made in the external wall of the female base 4.

Figure 11:
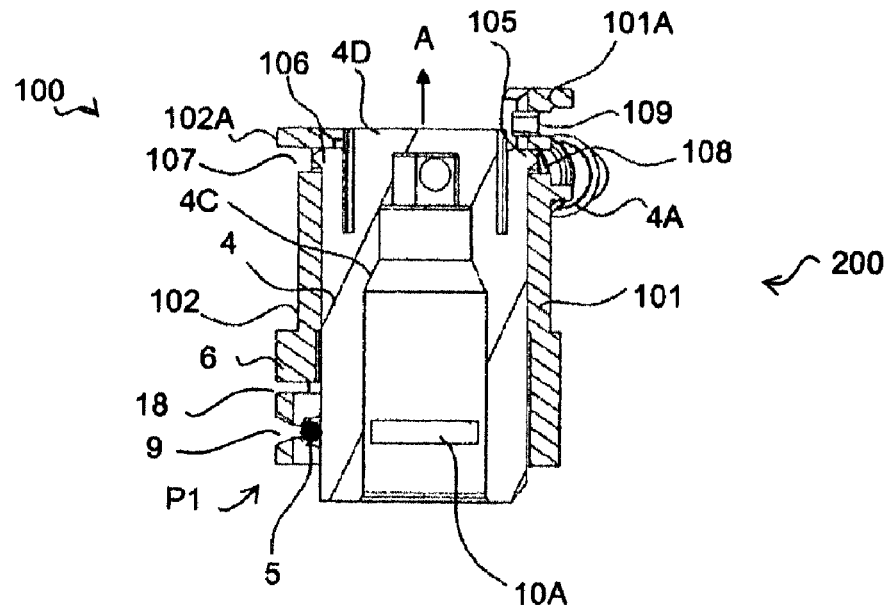
FIG. 11 is a view of a transversal section along axis XI-XI of FIG. 9 of the connector according to the invention, in the same position as FIG. 9.

Legs 101, 102 have respectively one free extremity 101A, 102A, the free extremity of leg 101 is protruding relative to the female base 4, while the free extremity 102A of leg 102 is flush with female base 4 at the upper surface 4D of the female base 4. As shown in FIG. 11, legs 101, 102 are blocked in this position by two detents 105, 106 respectively formed in the respective guide ways 103, 104 of the female base 4, cooperating with two notches 107, 108 in the form of slots respectively made in legs 101, 102, blocking the displacement of sleeve 6 in axial direction A in position P1.

Figure 10:
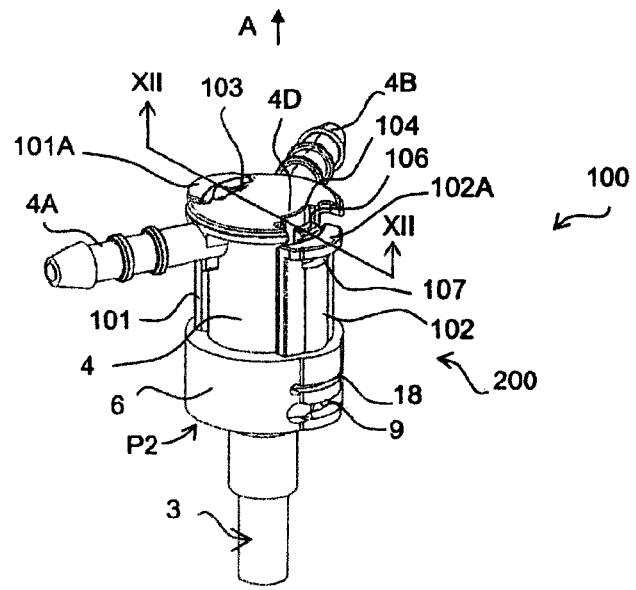
FIG. 10 is a perspective view of the connector according to the invention in another execution form, in the second axial position of the sleeve and when the male end-piece is fully inserted in the female base.
Figure 12:
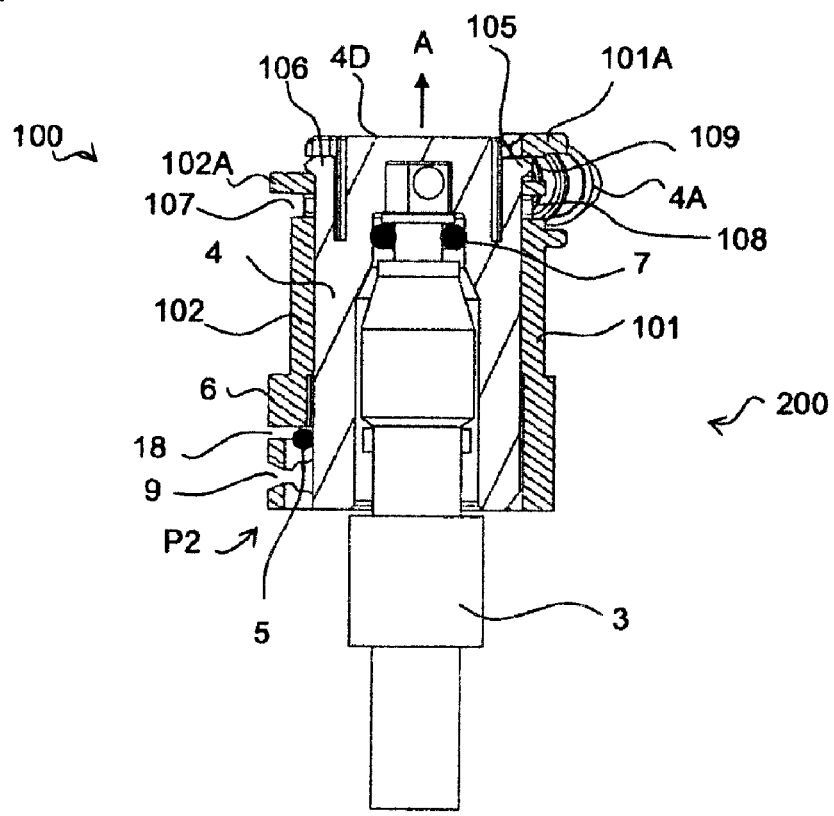
FIG. 12 is a view of a transversal section along axis XII-XII of FIG. 10 of the connector according to the invention in the same position as FIG. 10.

FIG. 10 shows the connector 100 according to the invention with the male end-piece 3 fully inserted in coupling 2, and the locking sleeve 6 occupying the second axial position P2. In this second axial position of locking sleeve 6, the free extremity 101A of leg 101 is now flush with the female base 4 and the extremity 102A of leg 102 of sleeve 6 is axially retracted relative to the female base 4. As shown in FIG. 12, legs 101, 102 are blocked in this position by detents 105, 106 which now cooperate respectively, on the one side, with a notch 109 in the form of a slot made in leg 101 above notch 108, and on the other side, with the free extremity 102A of leg 102, blocking the displacement of the sleeve in axial direction A in position P2.

As described previously in correspondence with connector 1, the displacement of the locking sleeve 6 from position P1 to position P2 and inversely, requires the application of a certain axial force on leg 101. The difference in height between extremities 101A, 102A of legs 101, 102 of sleeve 6 provides advantageously a flat contact area on the upper surface 4D of the female base 4, serving for the installation of coupling 200 on the male end-piece 3.

The respective dimensions of detent 105 and notches 108, 109 (same as the respective dimensions of detent 106, notch 107 and extremity 102A) are adjusted to correspond to the axial travel of the sleeve between the two position P1 and P2 which is approximately equivalent to the thickness in axial direction of staple 5.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:
1. A coupling for fluid pipe connector, comprising:
a female tubular base;
a male tubular end-piece insertable into the base along an axial direction to form a sealed joint;

a blocking element for blocking the end-piece in the base when the end-piece is inserted in the base, the blocking element elastically deformable in a radial direction and comprising a C-shaped rigid metallic wire with two free extremities and dimensioned for passing through the base when the blocking element is radially deformed; and a locking sleeve mounted around the blocking element and movable in the axial direction between a first axial position in which the locking sleeve allows deformation of the blocking element radially towards the exterior of the base and a second axial position in which the locking sleeve prevents radial deformation of the blocking element, the locking sleeve having at least one internal radial recess in which each corresponding free extremity of the blocking element is received when the locking element is radially deformed and the sleeve occupies the first axial position, each recess axially offset relative to the corresponding free extremity of the blocking element when the sleeve occupies the second axial position, thereby preventing radial deformation of the blocking element, wherein the locking sleeve includes a tubular body having an axially extending leg, the leg having a free extremity protruding relative to the base when the sleeve occupies the first axial position and flush with the base when the locking sleeve occupies the second axial position.

2. The coupling of claim 1, wherein the base includes at least one detent, the detent engaged within at least one notch provided on the leg of the locking sleeve when the sleeve occupies the second axial position.

3. The coupling of claim 1, wherein the locking sleeve includes a radial slot for lateral reception of the blocking element in the base.

4. A connector for fluid pipes, comprising a male tubular end-piece and a coupling of claim 1.

5. The connector of claim 4, wherein the coupling and the male tubular end-piece are made of plastic material.

\* \* \* \* \*